Sept. 22, 1970 MASAICHI FUKUYO 3,529,359
FLUIDIZED DRYING APPARATUS
Filed Aug. 30, 1968
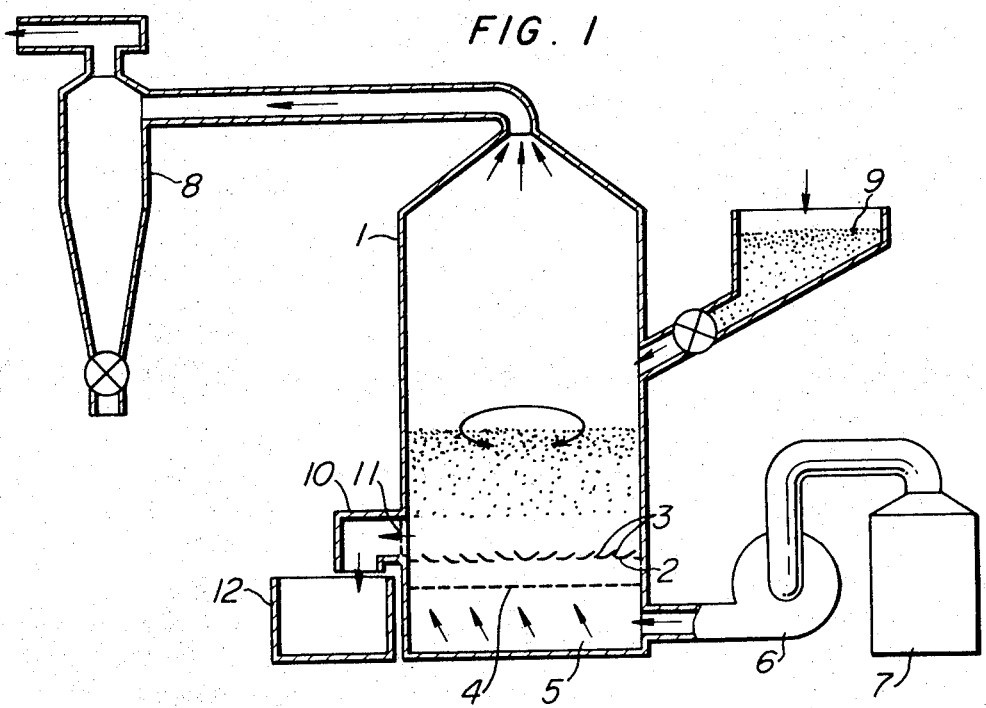
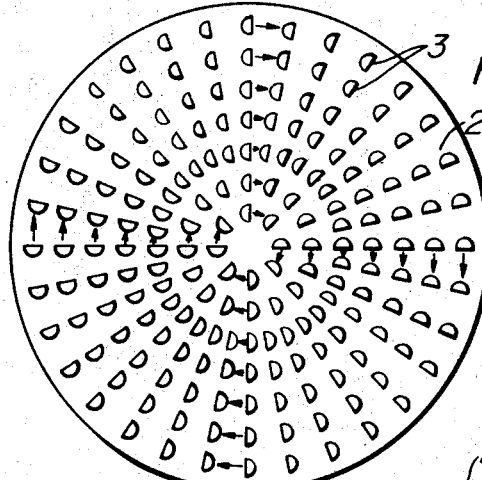
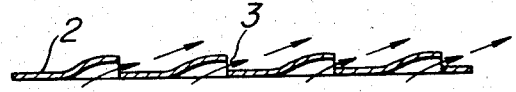
INVENTOR
Masaichi Fukuyo
BY
ATTORNEY { # United States Patent Office

3,529,359
Patented Sept. 22, 1970

3,529,359
FLUIDIZED DRYING APPARATUS
Masaichi Fukuyo, Haibara-gun, Shizuoka-ken, Japan, assignor to Kabushiki Kaisha Okawara Seisakusho, Shizuoka-ken, Japan, a corporation of Japan
Filed Aug. 30, 1968, Ser. No. 756,505
Claims priority, application Japan, May 11, 1968, 43/31,523
Int. Cl. F26b 17/00
U.S. Cl. 34—57         1 Claim

ABSTRACT OF THE DISCLOSURE

A fluidized drying apparatus which is capable of uniformly drying granular materials evenly in a short period of time and wherein a fluidizing chamber is so shaped as to facilitate ease of swirling of a drier gas therein and a number of gas passage holes are perforated through the bottom wall of said fluidizing chamber at an angle thereto so as to cause an ascending swirl of the drier gas in said chamber.

---

The present invention relates to a fluidized drying apparatus so constructed that a dryer gas is swirled in a fluidizing chamber.

Fluidized drying apparatus which have been commonly used heretofore, have the drawback that a material to be dried cannot be fluidized uniformly and therefore unevenness of drying tends to result, because since a dryer gas is blown into a fluidizing chamber in a vertical direction through a number of holes perforated vertically through the bottom wall of said chamber, a sufficient stirring of the material by the drier gas stream cannot be obtained and in addition a dead angle of gas stream is produced between adjacent holes.

The object of the present invention is to provide a fluidized drying apparatus which is free of the aforesaid drawback of the conventional apparatus.

According to the present invention, there is provided a fluidized drying apparatus wherein a fluidizing chamber is so shaped as to facilitate ease of swirling of a dryer gas therein and a number of gas passage holes are perforated through the bottom wall of said fluidizing chamber at an angle thereto so as to cause an ascending swirl of the dryer gas in said chamber. The fluidized drying apparatus of this invention has the advantage that the dryer gas supplied into the fluidizing chamber ascends therein in the form of a swirling stream, so that no dead angle of gas stream is formed at any portion of the fluidizing chamber. Another advantage is that since a material to be dried is completely stirred and mixed under the influence of the gyrational force of the gas stream, the particles of the material are uniformly suspended in the drier gas and dried effectively even when the particle sizes thereof vary greatly. Still another advantage is that according to the present invention, more heat of the drier gas is transferred to the particles than in the case when the bottom wall of the fluidizing chamber has vertical gas passage holes, or in other words, the thermal efficiency can be improved, because the duration wherein the drier gas passes through a given thickness of fluidized bed of particles becomes longer than in the case of latter. Owing to the advantages set forth above, it is possible, according to the present invention, to attain drying of glanular materials evenly in a short period of time. The fluidized drying apparatus of the instant invention is particularly advantageous in that no labor is required for removing the dried material from the apparatus when a dried material discharge opening is provided at the lower portion of the fluidizing chamber, because the fluidized material in gyratory motion in said fluidizing chamber is discharged to the outside of said chamber through said discharge opening automatically under the influence of centrifugal force.

FIG. 1 is a schematic view of an embodiment of the fluidized drying apparatus according to the present invention;

FIG. 2 is a plan view showing the bottom wall of the fluidizing chamber; and

FIG. 3 is a fragmentary cross-sectional view, in an enlarged scale, of the bottom wall showing the manner in which gas passage holes are provided in the bottom wall.

An embodiment of the fluidized drying apparatus of the present invention will be described hereunder with reference to the accompanying drawing.

Referring to FIG. 1, a fluidizing chamber 1 of the apparatus has a cross-sectional shape, e.g. circular cross-section, which facilitates ease of swirling of a drier gas. The bottom wall 2 of the fluidizing chamber 1 has a number gas passage holes 3 perforated therethrough at an angle thereto in such a manner that the inside openings thereof are arranged radially of said bottom wall and open in the same circumferential direction of said bottom wall as shown in FIGS. 2 and 3, so that the drier gas introduced into the fluidizing chamber therethrough may ascend in said chamber in the form of swirling stream. Reference numeral 4 designates a current equalizing plate disposed beneath the bottom wall 2 of the fluidizing chamber 1, 5 a gas chamber provided below the fluidizing chamber 1, 6 a blower by means of which the drier gas generated in gas generating means 7 is forced into the gas chamber 5, 8 a cyclone in which fine particles of the material entrained in the exhaust gas from the fluidizing chamber 1 is separated therefrom, 9 a supply hopper through which the material to be dried is fed into the fluidizing chamber 1, 10 a discharge port for the dried material provided in the lower portion of the side wall of the fluidizing chamber 1, 11 a cover to open and close the discharge port 10 and 12 a receptacle for receiving the dried material discharged through the discharge port 10.

In operating the fluidized drying apparatus of the invention constructed as described above, the dryer gas supplied into the gas chamber 5 by the blower 6 with pressure passes through the current equalizing plate 4 and the equalized current of drier gas is blown into the fluidizing chamber 1 through the slant holes 3 in the bottom wall 2. In this case, a gyratory motion is given to the drier gas by the slant holes 3 in the bottom wall and thus the drier gas ascends in the fluidizing chamber 1 while swirling therein, so that no dead angle of the gas stream is formed in said chamber. Upon feeding the material into the fluidizing chamber form the supply hopper 9 in this state, the material whirls in the fluidizing chamber while being suspended in the ascending swirl of the drier gas, whereby the material is stirred uniformly and even the particles of the material having largely different sizes can be dried evenly in a short period of time. When the discharge port 10 is opened, the dried material is automatically discharged into the receptacle through said discharge port under the influence of a centrifugal force created by the gyratory motion of the material. In the apparatus of the present invention wherein the particles of the material to be dried make a gyratory motion, less amount of particles scatters than in the conventional apparatus wherein the particles move mainly in a vertical direction.

What is claimed is:

1. A fluidized drying apparatus comprising a generally cylindrical casing, a perforated plate provided in said casing which divides said casing into an upper solids fluidizing chamber and a lower windbox chamber, perforations in said plate being inclined at an angle from the axis of said casing and each inclined perforation in operation directing gas passing therethrough at an acute angle to the surface of the plate and tangential to an imaginary circle centered along the longitudinal axis of said casing, means for feeding pulverulent or granular material into said upper chamber for fluidization and drying thereof, means for supplying a drying gas to said lower chamber which gas passes through said inclined perforations to fluidize the pulverulent or granular material thereabove, particle outlet means from said upper chamber, and gas exhaust means from said upper chamber.

References Cited

UNITED STATES PATENTS

| | | |
|---|---|---|
| 2,330,545 | 9/1943 | Benoit. |
| 2,719,112 | 9/1955 | Kearby et al. _____ 34—10 XR |
| 3,040,439 | 6/1962 | Frost. |
| 3,140,862 | 7/1964 | Schoppe. |
| 3,192,644 | 7/1965 | Knibbs et al. |
| 3,282,577 | 11/1966 | Cottle. |

FOREIGN PATENTS 1,293,023   4/1962   France.

FREDERICK L. MATTESON, JR., Primary Examiner

R. A. DUA, Assistant Examiner